No. 839,499. PATENTED DEC. 25, 1906.
C. S. MOTT.
ROLLER BEARING FOR AUTOMOBILE WHEELS.
APPLICATION FILED JAN. 6, 1905.

Attest:
L. Lee.
Arthur F. Kirton.

Inventor.
Charles S. Mott, per
Thomas S. Crane, atty.

UNITED STATES PATENT OFFICE.

CHARLES S. MOTT, OF UTICA, NEW YORK, ASSIGNOR TO HYATT ROLLER BEARING COMPANY, OF HARRISON, NEW JERSEY, A CORPORATION OF NEW JERSEY.

ROLLER-BEARING FOR AUTOMOBILE-WHEELS.

No. 839,499.

Specification of Letters Patent.

Patented Dec. 25, 1906.

Application filed January 6, 1905. Serial No. 239,868.

*To all whom it may concern:*

Be it known that I, CHARLES S. MOTT, a citizen of the United States, residing at 4 Springate street, Utica, county of Oneida, and State of New York, have invented certain new and useful Improvements in Roller-Bearings for Automobile-Wheels, fully described and represented in the following specification and the accompanying drawings, forming a part of the same.

The present invention is adapted for overhung journals like those projected from the steering-head of an automobile-axle; and the invention embraces a casing surrounding the journal with a set of antifriction-rolls in one end of the casing and in the opposite end, where a nut can be placed upon the end of the journal, a thrust-collar formed of a grooved ring upon the journal, and divided seats adjustable to and from one another to embrace the outer side of the balls, the casing having a thread in its outer end and an annular nut fitted to the thread to clamp the divided seats when adjusted, and the usual cap being fitted to the outer end of the casing to inclose the nut and the thrust-collar.

The invention consists partly in the particular construction for the thrust-collar and partly in the arrangement of the antifriction-rolls and the thrust-collar in the opposite ends of the casing, with the spoke-flanges upon the casing adjacent to the antifriction-rolls, so that the rolls sustain a greater part of the load, while the balls sustain the end thrust, as well as a part of the load.

Figure 1:
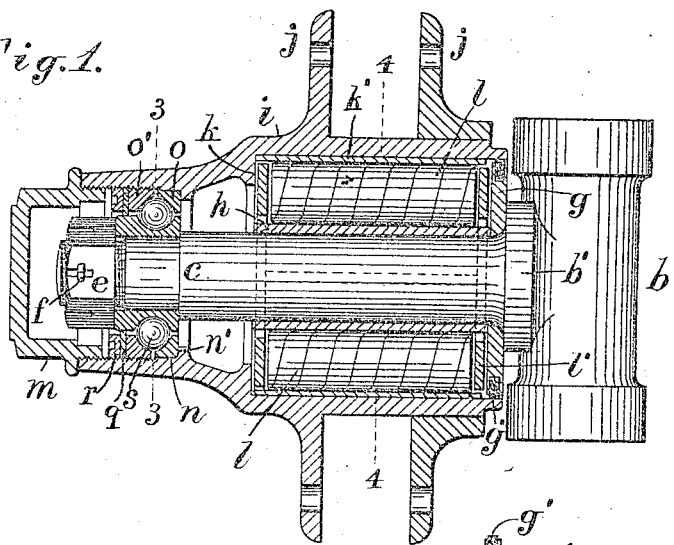
Figure 2:
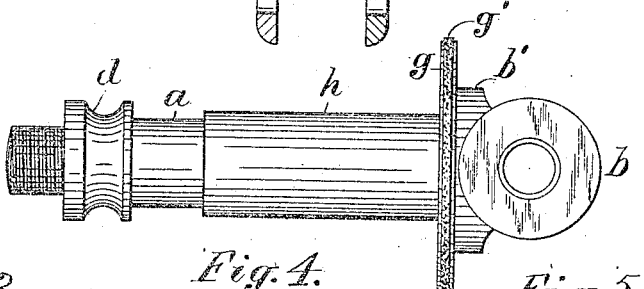
Figure 3:
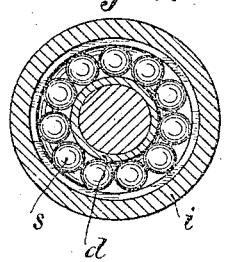
Figure 4:
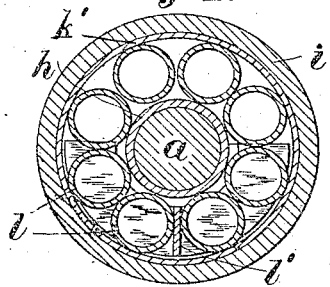
Figure 5:
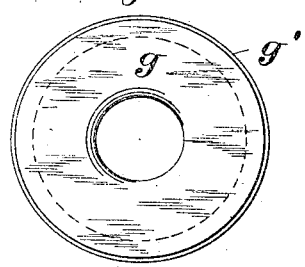
Figures 6, 7:
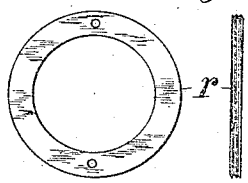
Figure 8:
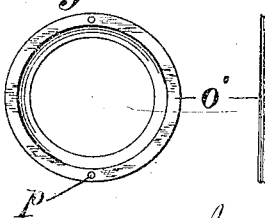

In the drawings, Figure 1 shows a hub for an automobile-wheel in longitudinal section at the center line where hatched. Fig. 2 is a plan of the journal and its attachments separate from the casing. Fig. 3 is a cross-section on line 3 3 in Fig. 1. Fig. 4 is a cross-section on line 4 4 in Fig. 1. Fig. 5 is a side view of the disk at the inner end of the journal with soft packing in the edge. Fig. 6 is a side view, and Fig. 7 an edge view, of the annular nut for the thrust-bearing. Fig. 8 is an inside view, and Fig. 9 an edge view, of one of the divided ball-seats for the thrust-bearing.

$a$ designates the body of the journal, shown integral with a socket $b$, by which it may be hinged upon the end of an automobile-axle and having the collar $b'$ at the inner end and a shoulder $c$ near the outer end, against which the grooved thrust-ring $d$ is clamped by a nut $e$, fitted to a thread on the end of the journal. A cotter $f$ is shown for locking the nut in place.

A disk $g$ is shown fitted against the collar $b'$ and held in place by a steel sleeve $h$, which is crowded upon the body $a$ against the collar to form a wearing-surface for antifriction-rollers. A yielding substance, as felt, $g'$, is fitted to groove in the edge of the disk to contact with the casing and exclude dust therefrom. The casing $i$ is shown with flanges $j$ for clamping the disk or spokes of the wheel. The sleeve $h$ is extended forwardly upon the journal as far as the antifriction-rolls are applied, and a shoulder $k$ is formed within the casing near the outer end of such sleeve, and a lining $k'$ is fitted within the casing to such shoulder. In practice the sleeve is pressed or shrunk upon the journal, so as to retain its position by friction.

A set of antifriction-rolls $l$, with the usual guide $l'$, (shown in Figs. 1 and 4,) are fitted between the shell $h$ and the lining $k'$.

The flanges $j$ are shown equidistant from the ends of the sleeve $h$ and lining $k'$, so that the load on the wheel falls chiefly on the rollers $l$. The outer end of the casing is formed with internal thread and a cap $m$ screwed therein. A socket $n$ is formed at the bottom of the thread with a shoulder $n'$ at its inner end, and divided seats $o'$ $o$ to engage the outer sides of the balls are fitted, respectively, to the screw-thread and to the socket $n$.

Figure 9:

The seat $o'$ is shown in Figs. 8 and 9 and is formed with holes $p$, by which a spanner may be applied to adjust it into the desired contact with the balls when the same are fitted between the groove of the ring $d$ and the face of the seat $o$. A washer $q$ is shown applied to the outer side of the seat $o'$, and an annular nut $r$ is screwed into the hub outside of the washer to press the same firmly against the seat $o'$ to lock the seat when adjusted.

The nut $e$ forms with the devices between the nut and the shoulder $n$ within the casing means for preventing longitudinal movement of the casing, and thus retains the inner end of the casing in contact with the packing $g'$ upon the disk $g$, and the packing is thus enabled to exclude dust continuously from the casing.

With the construction shown the nut e can be removed when the cap is taken off of the hub, and the hub-casing can then be drawn forward, pushing the entire thrust-collar (embracing the ring d, seats o', and balls s) off of the journal and drawing the lining k' off of the rolls l. As the seats o o' are locked in the casing by the nut r, they hold the balls and the ring d within the casing until the annular nut is released.

In assembling the parts the rolls l and their guide l' are placed upon the sleeve h, and the casing, with the thrust-collar therein, is pushed over the journal, thus bringing the thrust-collar upon the outer end of the journal to be secured thereon by the nut e, which not only locks the grooved collar d in place upon the journal, but by means of the shoulder k holds the antifriction-rolls in their working position between such shoulder and the disk g.

The dust-guard g' and the cap m serve to wholly exclude dirt from the bearing.

The specific constructions claimed herein are especially applicable to the bearing for a journal which is entirely overhung from a steering-socket b, as shown in the drawings, as such socket and journal are commonly formed in one piece by forging, and the disk g could not in such process be readily made of larger diameter than the socket b, but is by my construction secured adjacent to the collar b', and thus held in the desired relation to the socket by the sleeve h upon the journal.

Having thus set forth the nature of the invention, what is claimed herein is—

1. In a roller-bearing for a journal a formed integral with a steering-socket b having an integral collar b' adjacent to the socket, the combination, with the journal a, of the disk g fitted to the collar b' and having the groove with yielding packing g' in its edge, the sleeve h secured upon the journal in contact with the disk to hold it in place, the wheel-hub casing i having its inner end fitted to the said packing and provided with the internal shoulder k, the lining k' within the casing extended from the said shoulder to the disk, and the set of antifriction-rolls l and guide l' fitted between the sleeve and the lining k', a nut applied to the outer end of the journal, and means for holding the casing from longitudinal movement, to retain the casing in contact with the packing upon the disk.

2. The roller-bearing herein shown and described, having the journal a provided at one end with the collar b', the disk g fitted against such collar, the sleeve h secured upon the journal in contact with the disk to hold it in place, the wheel-hub casing i fitted to the said disk and having the internal shoulder k as set forth, the lining k' within the casing extending from the shoulder k to the disk g, the set of antifriction-rolls l fitted between the sleeve and the lining, the shoulder n' opposed to the shoulder k' with the shoulder c upon the journal in line therewith, the grooved ring d upon the journal clamped against the shoulder c, the ball-seat o fitted against the shoulder n', the ball-seat o' opposed thereto and movable longitudinally in the casing with balls s fitted thereto, and the casing having a thread within its outer end, with a nut fitted to such thread to adjust the seat o', the whole arranged and operated substantially as set forth.

3. In a roller-bearing for a journal a formed integral with a steering-socket b having an integral collar b' adjacent to the socket, the combination, with the journal having the shoulder c near its outer end, of the disk g fitted to the collar b' and having the groove with yielding packing g' in its edge, the sleeve h secured upon the journal in contact with the disk to hold it in place, the wheel-hub casing i having its inner end fitted to the said packing and provided with the internal shoulder k, the lining k' within the casing extended from the said shoulder to the disk, the set of antifriction-rolls l fitted between the sleeve and the lining k', the shoulder n' within the casing in line with the shoulder c upon the journal, the grooved ring d clamped against the shoulder c by the nut e, the ball-seat o fitted against the shoulder n', the ball-seat o' fitted to move longitudinally in the casing with balls s fitted thereto, the washer q applied to the outer side of the seat o', and the casing having a thread within its outer end with the nut r fitted thereto and operating upon the washer to adjust the seat o', as required, the whole arranged and operated substantially as herein set forth.

In testimony whereof I have hereunto set my hand in the presence of two subscribing witnesses.

CHARLES S. MOTT.

Witnesses:
Duncan H. Pierce
J. J. Conlon.